March 25, 1924.
J. E. CHASE
ICE CREAM CAN LIFTER AND CARRIER
Filed Feb. 13, 1922
1,488,455
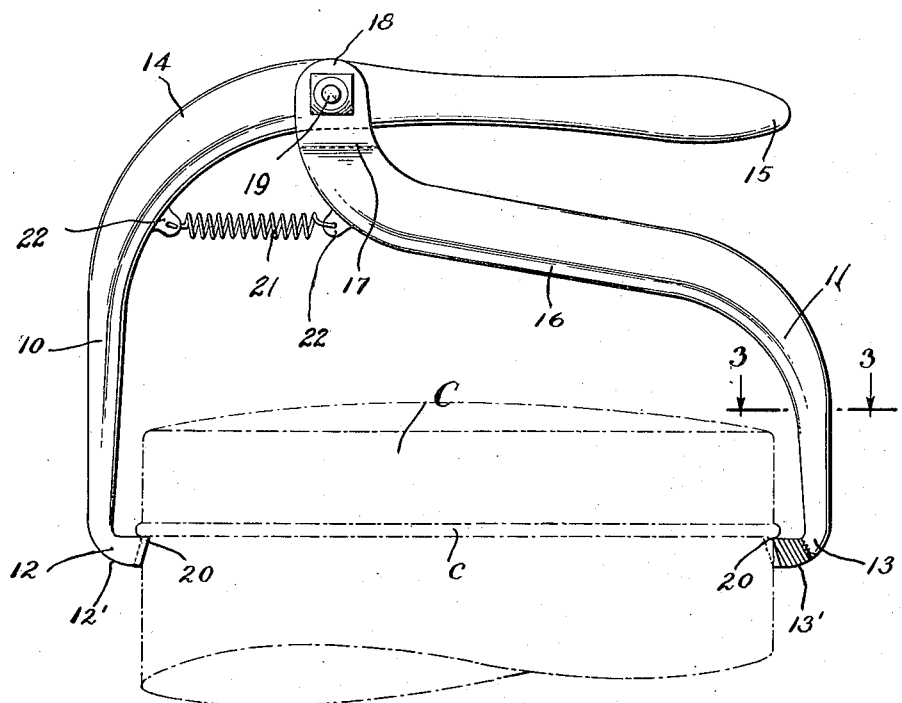
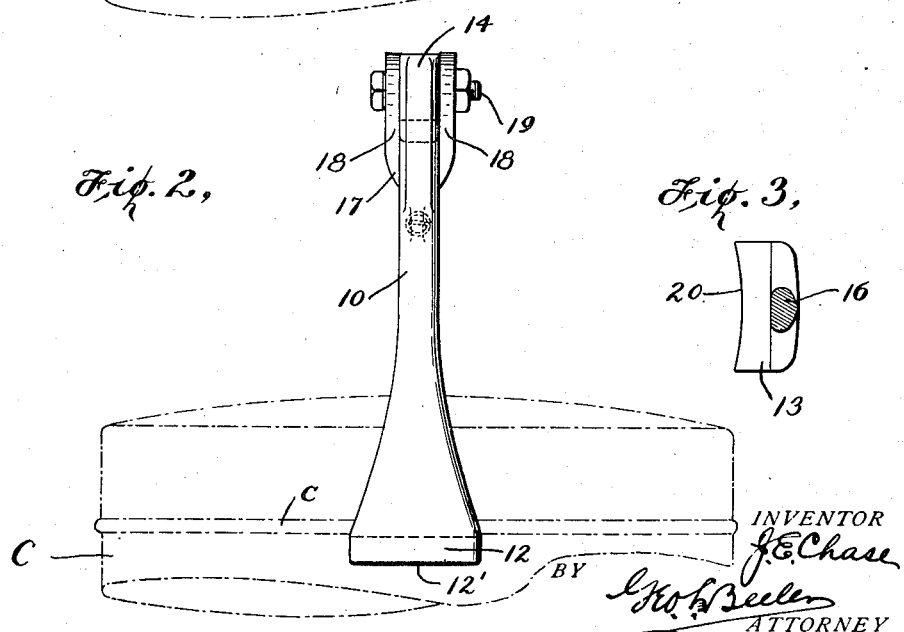

Patented Mar. 25, 1924.

1,488,455

UNITED STATES PATENT OFFICE.

JOSEPH E. CHASE, OF SCHENECTADY, NEW YORK, ASSIGNOR, BY MESNE ASSIGNMENTS, TO VAN WIE & CHASE CORPORATION, OF GLOVERSVILLE, NEW YORK, A CORPORATION OF NEW YORK.

ICE-CREAM-CAN LIFTER AND CARRIER.

Application filed February 13, 1922. Serial No. 536,214.

*To all whom it may concern:*

Be it known that I, JOSEPH EDWIN CHASE, a citizen of the United States, residing at Schenectady, in the county of Schenectady and State of New York, have invented certain new and useful Improvements in Ice-Cream-Can Lifters and Carriers, of which the following is a specification.

This invention relates to lifting devices and has particular reference to a lifter for use in withdrawing an ice cream can from its position when packed with ice within a shipping tub or barrel. It is well known that in order to remove a can of ice cream from a tub of broken ice and salt it is necessary generally first to remove a considerable portion of the broken ice so that the can of cream may be grasped by hand, the removal of the ice being necessary not only to gain access to the can but also to prevent the likelihood of any of the ice or salt getting into the ice cream.

Among the objects of the invention therefore is to provide a tool of a simple and effective nature and so constructed as to include a plurality of relatively slender hooks adapted to be projected downward through any reasonable amount of ice and salt that may be in the top of the tub and covering the top of the can, so that the tool may be applied to the can for removing it from the tub without necessitating any special consideration for the mass of ice and salt aforesaid.

Another object of the invention is to provide a tool adapted not only for grasping and lifting the can as aforesaid but also for carrying the can by a simple easy process in or suspended from one hand of the operator, whereas under ordinary practice the can can only be lifted or carried by direct application of both of the operator's hands to the can, an expedient both troublesome and uncomfortable, considering the nature of the article to be handled.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a side elevation indicating the improvement applied to the upper portion of an ice cream can as in lifting and carrying action, one jaw being in section.

Fig. 2 is an end elevation as would be seen looking toward the right in Fig. 1.

Fig. 3 is a horizontal section on the line 3—3 of Fig. 1.

Referring now more specifically to the drawings, the improvement includes two vertical jaws 10 and 11, terminating in hooks 12 and 13 on their lower ends at about the same level. The jaw 10 has a right angularly turned extension or shank 14 terminating in a handle 15 in line with said shank. The jaw 11 has a similarly disposed shank 16 to the end of which is fixed or secured a knuckle or head 17 comprising a pair of upwardly projecting lugs 18 between which the shank 14 is pivoted on a horizontal pivot 19. It will be noted that while the jaw 10 is materially longer than the jaw 11, the shank 16 is longer than the shank 14, so that the head 17 and pivot 19 are located approximately midway between the jaw 10 and the vertical axis of the can C. Thus the handle is located approximately coincident with said axis, a matter of great importance in the manipulation of the device.

The hooks 12 and 13 are provided with relatively sharp or rounded lower extremities 12' and 13' respectively, adapting them to be forced readily downward through the ice or between the ice and the vertical walls of the can. The inner or upper edge portion of each hook is indicated at 20, the same being outwardly convexed to conform to the cylindrical convexity of the can so that the edges 20 of the hooks will take directly under the bead c on the upper portion of the can and against which the cover is ordinarily fitted or sealed. There is therefore slight likelihood that the jaws or hooks will slip laterally from lifting or carrying position.

When the tool is applied as just described to the upper end of the ice cream can, a result readily obtainable while manipulating the tool with one hand only applied to the handle, in order to lift the can the operator simply lifts upward vertically on the handle, which action causes the hook ends of the jaws to be forced toward each other as well as biting firmly beneath the bead as above described. The handle and jaw 10 operate as a lever of the first class tending to rotate to the left around the axis of the pivot 19. The resistance afforded at the hook 12 however tends to cause the handle to move upward or to the left in Fig. 1, and this tendency increases the grip or binding action of the hook 13 toward the can on the opposite side. In other words, there is a resistance set up by each hook with respect to the other while the operator simply lifts upward on the handle. After the can is withdrawn from the tub of ice or lifted from any other position or place, the can may be carried for delivery or similar purposes simply by suspending it from the operator's hand grasping the handle. To release the device from the can the operator simply sets the can down and lowers the handle 15 causing the jaws to move outward and away from the can, after which the tool as a whole may be lifted laterally from engaging position.

A tool made in accordance with this specification is exceedingly simple, cheap, and durable, and withal is most effective and reliable in use. By attaching a spring 21 to the two jaws as by means of lugs 22 formed on the respective jaws or their shanks, the tendency is for the hooks 12 and 13 to be drawn automatically toward each other independent of the upward lift on the handle 15. This not only increases the grip between the jaw hooks and the can, preventing slippage, but is particularly advantageous in causing the hooks of the jaws to crowd close along the sides of the can while they are being forced downward through the mass of ice and salt.

I claim:

An ice cream can lifter and carrier comprising a pair of substantially parallel jaws each terminating in an inwardly directed hook having a concaved edge conforming to the exterior surface of the can, said hooks being on the same level while one of the jaws is longer than the other, the shorter of said jaws having an angularly turned shank extending laterally therefrom close over the top of the can and toward and relatively close to the longer jaw, said shank having an upwardly turned head adjacent to the longer jaw and including a pair of parallel upright lugs, and the longer jaw being provided with an angularly turned shank extending between said lugs and terminating in a handle the center of which is about midway between the two jaws, a horizontal pivot passing through said lugs and the latter mentioned shank, and a contractile spring extending horizontally between the longer jaw and the headed portion of the shorter jaw, substantially as set forth.

In testimony whereof I affix my signature.

JOSEPH E. CHASE.